United States Patent
Zoppas et al.

(10) Patent No.: US 7,942,664 B2
(45) Date of Patent: May 17, 2011

(54) INJECTION NOZZLE PLUGGING ROD

(75) Inventors: Matteo Zoppas, Conegliano (IT);
Andrea Bazzo, S. Lucia di Piave (IT);
Massimo Rossi, Orsago (IT); Loris Pilat, Follina (IT)

(73) Assignee: S.I.P.A. Societa' Industrializzazione Progettazione E Automazione S.p.A., Vittorio Veneto (IT)

( * ) Notice: Subject to any disclaimer, the term of this patent is extended or adjusted under 35 U.S.C. 154(b) by 36 days.

(21) Appl. No.: 12/442,087

(22) PCT Filed: Sep. 19, 2007

(86) PCT No.: PCT/EP2007/059880
§ 371 (c)(1),
(2), (4) Date: Mar. 19, 2009

(87) PCT Pub. No.: WO2008/034839
PCT Pub. Date: Mar. 27, 2008

(65) Prior Publication Data
US 2010/0040725 A1 Feb. 18, 2010

(30) Foreign Application Priority Data
Sep. 20, 2006 (IT) .............................. RM2006A0499

(51) Int. Cl.
*B29C 45/23* (2006.01)
(52) U.S. Cl. ........................................ 425/564; 425/566
(58) Field of Classification Search .................. 425/562, 425/563, 564, 565, 566
See application file for complete search history.

(56) References Cited

U.S. PATENT DOCUMENTS

| | | | |
|---|---|---|---|
| 6,485,288 B2 * | 11/2002 | Lee | 425/564 |
| 7,347,684 B2 * | 3/2008 | Tabassi et al. | 425/564 |
| 7,517,214 B2 * | 4/2009 | Olaru et al. | 425/564 |
| 2003/0143298 A1 | 7/2003 | Blais | |
| 2004/0265421 A1 * | 12/2004 | Olaru | 425/564 |

FOREIGN PATENT DOCUMENTS

| | | |
|---|---|---|
| EP | 0 635 350 | 1/1995 |
| JP | 61 206612 | 9/1986 |
| JP | 2002 283412 | 10/2002 |

OTHER PUBLICATIONS

Thermodyne Hotrunner Systems—SIPA Division: "Accessories.pdf" [onLine] Jul. 2003, XP002463490, pp. 1-11.
Bothur C; "Breites Spektrum Neuigkeiten zum Therma Verschlussdusen" Plastverarbeiter, Huethig GMBH, Heidelberg, DE, vol. 54, No. 12, Dec. 2003, pp. 48-49, XP-001185540; ISSN: 0032-1338; p. 48, left-hand column, last paragraph; figure 1.

* cited by examiner

*Primary Examiner* — Tim Heitbrink
(74) *Attorney, Agent, or Firm* — Sampson & Associates, P.C.

(57) ABSTRACT

An injection nozzle plugging rod (4) of machines for molding plastic material containers, provided with a locking system suitable for preventing the separation of the parts forming the actuating pneumatic piston of the same rod, said piston being subjected to considerable stresses during the machine operation. Thus, the rod according to the invention is able to prevent the piston binding, and therefore also the locking of the same rod, considerably reducing the number of maintenance interventions and thus increasing the throughput of the molding machine.

4 Claims, 1 Drawing Sheet

INJECTION NOZZLE PLUGGING ROD

FIELD OF THE INVENTION

The present invention relates to an injection nozzle plugging rod of a machine for moulding containers made of plastic.

STATE OF THE ART

The state of the art contemplates several injection systems of moulding machines provided with a nozzle plugging rod.

Such systems are provided with double-acting pneumatic pistons, to which a corresponding plugging rod is integrally fixed. It is the object of the actuating pneumatic piston to open and close the passage for the molten plastic material within the nozzle, by means of the plugging rod or simply shutter.

One of the drawbacks of the known injection systems is to have to provide machine stops for maintenance due to failures of the pneumatic piston locking devices, generally including a plurality of screws.

Indeed in most cases, there occurs an unscrewing and/or breaking of the screws which join the two or more parts forming the pneumatic piston, generally the piston body and the bottom. This requires urgent maintenance interventions with the consequent stop of production.

Moreover, the throughput increase of the modern moulding injection machines, with moulding processes increasingly pushed to the limit, causes an increasingly high stress on the injection moulds, and thus on the pneumatic piston-rod assembly increasingly subjected to the above-mentioned drawbacks.

An example of injection system presenting these disadvantages is described in the document WO00/74920.

A need is thus felt to make a plugging rod allowing to overcome the above-mentioned drawbacks.

SUMMARY OF THE INVENTION

It is the primary scope of the present invention to make an injection nozzle plugging rod of moulding machines, provided with a locking system suitable for preventing the separation of the parts forming the pneumatic piston subjected to considerable stresses during the machine operation.

It is a further object of the rod according to the invention to prevent the piston binding, and therefore also the locking of the same plugging rod, thus considerably reducing the number of the maintenance interventions and increasing the throughput of the moulding machine.

Therefore, the present invention aims to achieve the above-discussed objects making an injection nozzle plugging rod of a machine for moulding plastic material containers which is provided at one of its ends with an actuating piston, in which said actuating piston includes a substantially cylindrical body, a locking screw internally screwed on said body, and an externally screwed ring nut on said locking screw so as to lock the locking screw-body assembly when the screw is completely screwed.

Such rod displays the advantage to have a locking system of the nut/lock nut type having an anti-screwing function.

Advantageously, said locking system, in virtue of its simple structure, is a cost effective solution to the problem of the separation of the parts forming the piston during operation of the injection moulding machine.

BRIEF DESCRIPTION OF THE FIGURES

Further characteristics and advantages of the invention will become more apparent in view of the detailed, but not exclusive, description of a preferred embodiment of a plugging rod, described by way of non-limitative example, with the aid of the accompanying drawing, in which.

DETAILED DESCRIPTION OF A PREFERRED EMBODIMENT OF THE INVENTION

Figure 1:
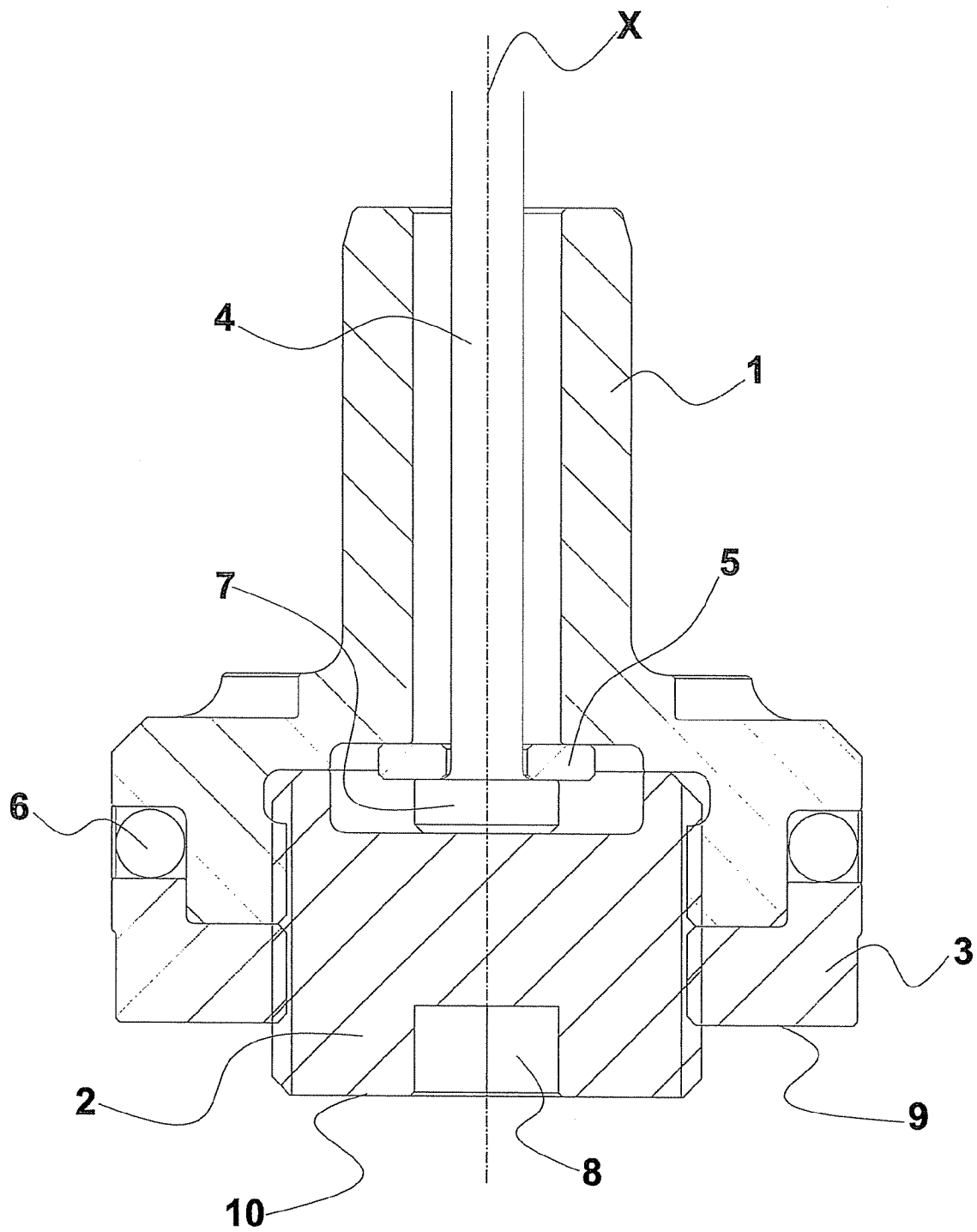
FIG. 1 depicts a longitudinal section of a plugging rod according to the invention.

An injection system generally used in the moulding machines for the production of plastic material containers comprises:
- an injection nozzle with a hot channel for the passage of the molten plastic material;
- a plugging rod, or simply shutter, of said nozzle;
- a double-acting pneumatic piston, arranged within a corresponding actuating chamber or cylinder, suitable for operating said rod;
- a thrust block serving as a guide for the shutter.

With reference to FIG. 1, there is shown an advantageous embodiment of a plugging rod according to the present invention.

Such plugging rod 4 is provided at one of its ends with the actuating pneumatic piston, comprising:
- a substantially cylindrical body 1,
- a locking screw 2, and
- a ring nut 3.

Advantageously, the locking screw 2, internally screwed to the body 1 or top of the piston, holds the shutter 4 within the piston.

The rod 4 is tightened between the locking screw 2 and the body 1 of the 10 piston. Advantageously, a washer 5 may be interposed between the base 7 of the rod 4 and the body 1.

The ring nut 3, externally screwed on the locking screw 2, locks the latter and completes the piston assembly. The ring nut 3 is therefore the lower part of the piston (FIG. 1).

The insertion of a gasket or seal 6, such as for example an o-ring, is provided between the ring nut 3 and the body 1 of the piston.

The rod-piston assembly mounting comprises the following steps:
- inserting the rod 4 within the body 1 of the piston, possibly providing the washer 5 between the base 7 of the rod 4 and said body,
- tightening the rod 4 by screwing the locking screw 2 on the body 1,
- screwing the ring nut 3 on the locking screw 2.

The rod-piston assembly mounting and the corresponding locking is therefore reliable and at the same time considerably simplified.

In FIG. 1, the extension along the longitudinal axis X of the ring nut 3 is such that, once the ring nut is screwed on the screw 2, the end surface 10 of the screw exceeds the end surface 9 of the same ring nut.

On the other end, another variation (not shown) provides a longitudinal length of the ring nut 3 such that the end surface 10 of the screw does not exceed the end surface 9 of the ring nut.

The end surface 10 of the screw 2 may be provided with a compartment 8 for inserting an allen wrench.

Advantageously, the above described device according to the invention, with its anti-screwing function, allows for a decrease in the number of maintenance interventions and, therefore, an increase in the throughput of the moulding machine.

The invention claimed is:

1. An injection nozzle plugging rod of a machine for moulding plastic material containers, provided at one of its ends with an actuating piston, wherein said actuating piston comprises a substantially cylindrical body, a locking screw internally screwed on said body, and a ring nut externally screwed on said locking screw so as to lock the locking screw-body assembly when the screw is completely screwed, wherein a base of said rod is tightened between the locking screw and the body.

2. A plugging rod according to claim 1, wherein a washer is interposed between the body of the piston and the base of the plugging rod.

3. A plugging rod according to claim 1, wherein a seal is provided between the ring nut and the body.

4. A plugging rod according to claim 3, wherein said seal is an o-ring.

* * * * *